(12) United States Patent
Howard et al.

(10) Patent No.: US 11,131,347 B2
(45) Date of Patent: Sep. 28, 2021

(54) FLEXIBLE COUPLINGS WITH MULTI-MODE DIAPHRAGM PAIRS

(71) Applicant: Sikorsky Aircraft Corporation, Stratford, CT (US)

(72) Inventors: Bertrand J. Howard, Shelton, CT (US); Christopher Briddell, New Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 505 days.

(21) Appl. No.: 15/933,030

(22) Filed: Mar. 22, 2018

(65) Prior Publication Data

US 2019/0293126 A1 Sep. 26, 2019

(51) Int. Cl.
*F16D 3/72* (2006.01)
*B64D 35/00* (2006.01)

(52) U.S. Cl.
CPC .............. *F16D 3/72* (2013.01); *B64D 35/00* (2013.01)

(58) Field of Classification Search
CPC .. F16D 3/72; F16D 3/78; B64D 35/00; B64C 27/14
USPC ...................................................... 464/79, 99
See application file for complete search history.

(56) References Cited

U.S. PATENT DOCUMENTS

| | | | |
|---|---|---|---|
| 4,247,061 A | 1/1981 | Kuczynski et al. | |
| 5,000,722 A * | 3/1991 | Zilberman | F16D 3/72 464/79 |
| 5,158,508 A | 10/1992 | Sakaguchi et al. | |
| 5,545,090 A * | 8/1996 | Kirschey | F16D 3/74 464/99 |
| 7,901,142 B2 | 3/2011 | Mathis | |
| 8,235,828 B2 * | 8/2012 | Davies | F16D 3/72 464/79 |
| 8,591,345 B2 | 11/2013 | Stocco et al. | |
| 9,441,490 B2 | 9/2016 | Frischbier | |
| 9,458,891 B2 | 10/2016 | Julian | |
| 9,546,694 B2 | 1/2017 | Julian | |
| 9,989,099 B2 | 6/2018 | Davies et al. | |

FOREIGN PATENT DOCUMENTS

NO 19313 * 9/1909 ............. 464/99

* cited by examiner

*Primary Examiner* — Greg Binda
(74) *Attorney, Agent, or Firm* — Michael Best & Friedrich LLP

(57) ABSTRACT

A flexible coupling includes a first disc and a second disc arranged along a rotation axis. The first disc and the second disc each include a radially inner hub portion, a radially outer rim portion, and a diaphragm portion extending between the hub portion and the rim portion. The first disc rim portion is connected to the second disc rim portion and the first disc has a diametral response mode that is different than a diametral response mode of the second disc to limit deformation in the flexible coupling when communicating rotation between a drive member and a driven member connected to one another by the flexible coupling. Drive trains and methods of making flexible couplings are also described.

22 Claims, 5 Drawing Sheets

FLEXIBLE COUPLINGS WITH MULTI-MODE DIAPHRAGM PAIRS

BACKGROUND OF THE INVENTION

1. Field of the Invention

The present disclosure is directed to flexible couplings, and more particularly to flexible couplings having diaphragm pairs with multiple response modes for dampening excitation forces exerted on the flexible coupling.

2. Description of Related Art

Vehicle drive trains, such as in rotorcraft, commonly include couplings interconnecting drive elements and driven elements. Since misalignment can exist in such drive trains flexible couplings are generally employed to accommodate axial or angular misalignment between the mechanical rotation source and the device powered by the source of mechanical rotation. Examples of flexible couplings include diaphragm couplings, which have contoured diaphragm disc pairs which cyclically deflect during rotation to accommodate misalignments.

Diaphragm discs typically have natural vibratory response characteristics, i.e., diametral response modes, that occur at certain excitation frequencies. In some drive trains system level excitations communicated to a diaphragm coupling by the drive train can periodically correspond to the diametral response mode of the diaphragm discs, such as during an engine speed excursion. The excitations associated by such system level events can cause the diaphragm discs to experience increased deflection from diametral mode excitation, and rapidly accumulate stress. In certain instance the accelerated stress can result in reduced service life, fracture, and/or the loss of the capability to transfer power through the flexible coupling during operation.

Such conventional methods and systems have generally been considered satisfactory for their intended purpose. However, there is still a need in the art for improved flexible couplings. The present disclosure provides a solution for this need.

SUMMARY OF THE INVENTION

A flexible coupling includes a first disc and a second disc arranged along a rotation axis. The first disc and the second disc each include a radially inner hub portion, a radially outer rim portion, and a diaphragm portion extending between the hub portion and the rim portion. The radially outer rim portion of the second disc is connected to the radially outer rim portion of the first disc. The first disc and the second disc are shaped such that the diametral response mode of the first disc is different than a diametral response mode of the second disc to limit deformation in the flexible coupling when communicating rotation between a drive member and a driven member connected to one another by the flexible coupling.

In certain embodiments, the second diaphragm portion can be shaped such that the second diaphragm disc dampens the first diaphragm disc when excited at a frequency corresponding to the first diametral response mode. The first diaphragm portion can be shaped such that the first diaphragm disc dampens the second diaphragm disc when the second diaphragm disc is excited at a frequency corresponding to the second diametral response mode.

In accordance with certain embodiments, the first diaphragm portion and the second diaphragm portion can have uniform disc thickness variation. The first diaphragm portion and the second diaphragm portion can have non-uniform disc thickness variation. The first diaphragm portion and the second disc diaphragm portion can be symmetric to one another. The first diaphragm portion and the second diaphragm portion can be asymmetric relative to one another.

It is contemplated that, in certain embodiments, a radial length of the first diaphragm portion can be equivalent to a radial length of the second diaphragm portion. A maximum thickness of the first diaphragm portion can be greater than a maximum thickness of the second diaphragm portion. A minimum thickness of the first diaphragm portion can be greater than a minimum thickness of the second diaphragm portion.

It is also contemplated that, in accordance with certain embodiments, the first diaphragm portion and the second diaphragm portion can taper from different radial offsets. The first diaphragm portion and the second diaphragm portion can taper to a common radial offset. A radial length of the first diaphragm portion can be greater than a radial length of the second diaphragm portion. Thickness of the first diaphragm portion can taper between the first radially inner hub portion and the first radially outer rim portion at a rate that differs from a rate that the thickness of the second diaphragm portion tapers between the second radially inner hub portion and the second radially outer rim portion.

A drive train includes a flexible coupling as described above. A drive member is rotatably fixed to the first radially inner hub portion and a driven member rotatably fixed to the second radially inner hub portion. Frequency spacing of the first disc diametral response mode is different than spacing of the second disc diametral response mode from an excitation frequency of the drive member. In certain embodiments, the first diaphragm portion and the second diaphragm portion can have uniform disc thickness variation. The first diaphragm portion and second diaphragm portion can be asymmetric relative to one another. In accordance with certain embodiments, the first diaphragm portion and the second diaphragm portion can have uniform disc thickness variation. The first and second diaphragm portions can be symmetric to one another.

It is contemplated that the first diaphragm portion and the second diaphragm portion can have non-uniform disc thickness variation. The first diaphragm portion and the second diaphragm portion can be symmetric. The first diaphragm portion and the second diaphragm portion can have non-uniform disc thickness variation and the first diaphragm portion and the second diaphragm portion can be symmetric to one another.

A method of making a flexible coupling for a drive train includes defining a first diaphragm portion between a first radially inner hub portion and a first radially outer hub portion of a first disc with a first diametral response mode, defining a second diaphragm portion between a second radially inner hub portion and a second radially outer hub portion of a second disc with a second diametral response mode, and connecting the second radially outer rim portion of the second disc to the first radially outer rim portion of the first disc. The second diametral response mode is different than the first diametral response mode to limit deformation in the flexible coupling when communicating rotation between a drive member and a driven member connected to one another by the flexible coupling.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
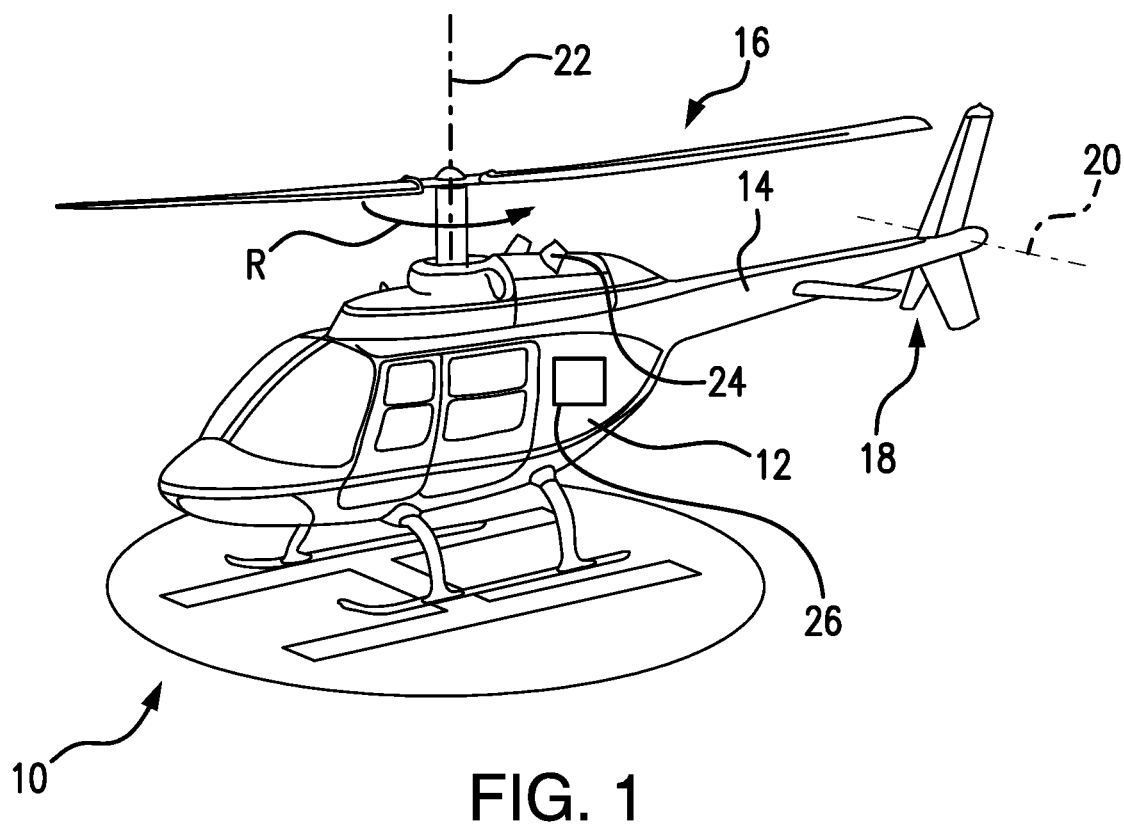
FIG. 1 is a schematic view of an exemplary embodiment of a rotorcraft constructed in accordance with the present disclosure, showing drive train with a multi-mode flexible coupling connecting an engine to a rotor system carried by the rotorcraft.

Reference will now be made to the drawings wherein like reference numerals identify similar structural features or aspects of the subject disclosure. For purposes of explanation and illustration, and not limitation, a partial view of an exemplary embodiment of flexible coupling in accordance with the disclosure is shown in FIG. 1 and is designated generally by reference character 100. Other embodiments of flexible couplings, drive trains having such flexible couplings, and methods of making flexible couplings in accordance with the disclosure, or aspects thereof, are provided in FIGS. 2-5, as will be described. The flexible couplings described herein can be used for drive trains in vehicles, such as in rotorcraft, though the present disclosure is not limited to rotorcraft or to vehicles in general.

Referring to FIG. 1, a rotorcraft 10 is shown. Rotorcraft 10 has a fuselage 12 with a longitudinally extending tail 14, a main rotor system 16, and a tail rotor system 18. Tail rotor system 18 is supported for rotation about a tail rotor rotation axis 20 extending through longitudinally extending tail 14. Main rotor system 16 is supported for rotation about a main rotor rotation axis 22 extending through fuselage 12. One or more main engine 24 is carried by fuselage 12 and is operably connected to main rotor system 16 and tail rotor system 18 through a drive train 26. Drive train 26 communicates mechanical power via rotation R from the one or more main engine 24 to the main rotor system 16 and/or tail rotor system 18 and includes flexible coupling 100 (shown in FIG. 2), which communicates rotation R while accommodating misalignment within drive train 26, as will be described. Examples of suitable flexible couplings include diaphragm couplings, such as diaphragm couplings described in U.S. Pat. No. 5,158,508 to Stocco, issued on Oct. 27, 1992, the contents of which are incorporated herein by reference in its entirety. While a helicopter 10 having a single main rotor and tail rotor system is shown, it is to be understood and appreciated that rotorcraft having tandem rotors and/or coaxial rotor systems, such as rotorcraft employing X2® technology, can also benefit from the present disclosure.

Figure 2:
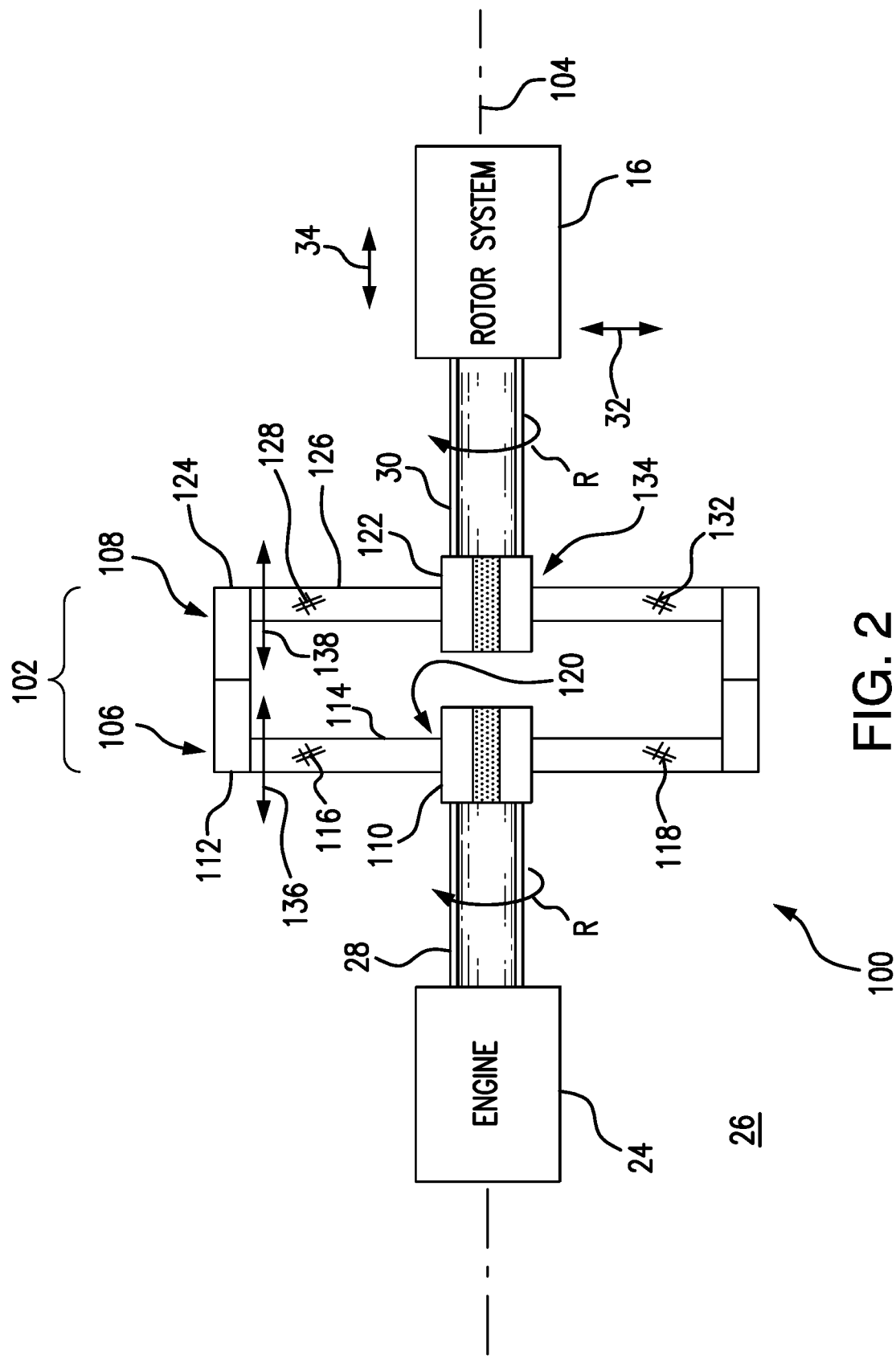
FIG. 2 is a schematic view of the drive train of FIG. 1, showing the drive train communicating rotation between drive member and a driven member while accommodating misalignment between the drive member and the driven member.

With reference to FIG. 2, drive train 26 is shown. Drive train 26 includes a drive member 28, a driven member 30, and flexible coupling 100. Flexible coupling 100 includes a disc pair 102 and connects drive member 28 with driven member 30 for communicating rotation R from drive member 28 and driven member 30. While single drive member 28 connected to single driven member 30 interconnected by single disc pair 102 is shown in FIG. 2, it is to be understood and appreciated the drive trains and flexible couplings having more than more than two diaphragm discs can also benefit from the present disclosure.

Drive member 28, driven member 30, and flexible coupling 100 are each arranged along a rotation axis 104. Disc pair 102 includes a first disc 106 and a second disc 108 that are arranged axially between main engine 24 and main rotor system 16. In particular, first disc 106 is arranged axially between drive member 28 and second disc 108 and second disc 108 is arranged axially between first disc 106 and main rotor system 16. As will be appreciated by those of skill in the art in view of the present disclosure, misalignment can exist between drive member 28 and driven member 30, e.g., angular misalignment 32 and/or an axial misalignment 34, which flexible coupling 100 accommodates during rotation via deformation.

First disc 106 has a first radially inner hub portion 110, a first radially outer rim portion 112 and a first diaphragm portion 114. First radially inner hub portion 110 is connected to drive member 28. First diaphragm portion 114 extends between first radially inner hub portion 110 and first radially outer rim portion 112, and connects first radially inner hub portion 110 to first radially outer rim portion 112. First radially outer rim portion 112 is arranged radially outward of first diaphragm portion 114 and is connected to second disc 108. First disc 106 has a diametral response mode 116 that is a function of at least one of a material 118 forming first disc 106 and the shape of first disc 106, e.g., a radial cross-sectional profile of first diaphragm portion 114 and/or a radial offset 120 from first radially inner hub portion 110 at which first diaphragm portion 114 begins to taper.

Second disc 108 is similar to first disc 106 and has a second radially inner hub portion 122, a second radially outer rim portion 124, and a second diaphragm portion 126. Second radially inner hub portion 122 is connected to driven member 30. Second diaphragm portion 126 extends between second radially inner hub portion 122 and second radially outer rim portion 124, and connects second radially inner hub portion 122 with second radially outer rim portion 124. Second radially outer rim portion 124 is arranged radially outward of second diaphragm portion 126 and is connected to first disc 106 at first radially outer rim portion 112 of first disc 106. Second disc 108 has a diametral response mode 128 that is a function of at least one of a material 132 forming first disc 106 and a shape of second disc 108, e.g., radial cross-sectional profile of second diaphragm portion 126, and a radial offset 134 from which second diaphragm portion 126 begins to taper.

It is contemplated that diametral response mode 116 of first disc 106 differ from diametral response mode 128 of second disc 108. In certain embodiments the difference between diametral response mode 116 of first disc 106 and diametral response mode 128 of second disc 108 is attributable at least in part to differences between material 118 of first disc 106 and material 132 of second disc 108. In accordance with certain embodiments the difference between diametral response mode 116 and diametral response mode 128 is attributable at least in part to differences between respective shapes of first diaphragm portion 114 and second diaphragm portion 126. For example, the rate of taper of second diaphragm portion 126 can be different from the rate of taper of first diaphragm portion 114. Alternatively or additionally, second diaphragm portion 126 can begin its taper from second radially inner hub portion 122 at a larger axial thickness than first diaphragm portion 114. Further, second diaphragm portion 126 can taper to a minimum axial thickness that is greater than a minimum axial thickness of first diaphragm portion 114. It is also contemplated that second diaphragm portion 126 can begin its taper from an offset radially outward from the offset at which first diaphragm portion 114 begins its taper.

As will be appreciated by those of skill in the art in view of the present disclosure, diametral response mode 116 of first disc 106 cooperates with diametral response mode 128 of second disc 108 to determine diametral deflections of first disc 106 and second disc 108 for a given amount of misalignment. In embodiments described herein, difference between diametral response mode 116 of first disc 106 and diametral response mode 128 of second disc 108 causes a diametral deflection 136 of first disc 106 to be different from a diametral deflection 138 of second disc 108 for a given amount of deflection. The difference in diametral deflection in turn causes each of first disc 106 and second disc 108 to dampen forces exerted from the other, detuning each of first disc 106 and second disc 108 from the other of first disc 106 and second disc 108. This allows the employment of existing flexible coupling diaphragm disc technology, albeit differently in each disc of the disc pair 102, for the prevention of prevent cracking (or fracture) of the diaphragm disc from system level imbalances.

Figure 3A:
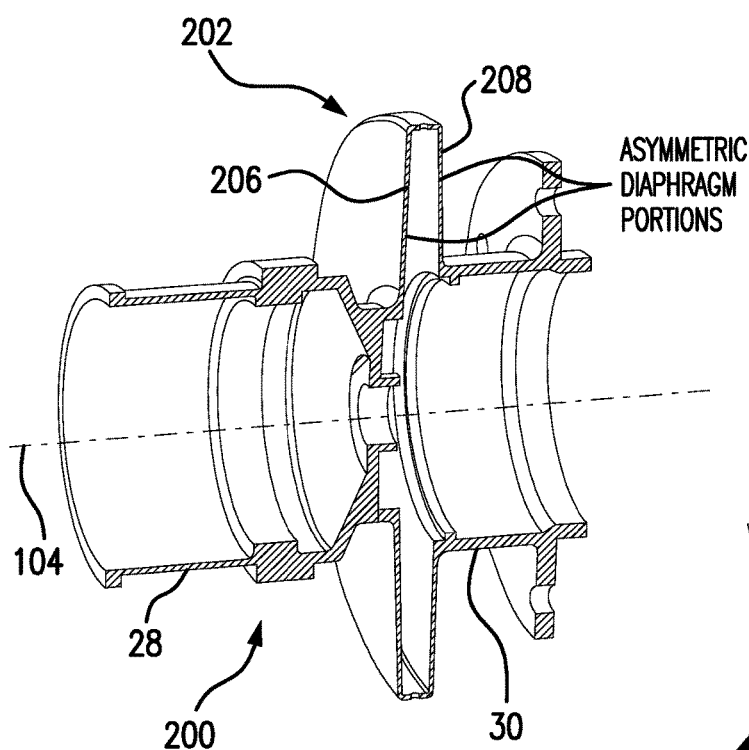
FIGS. 3A-3C are cross-sectional perspective views of the flexible coupling of FIG. 1 according to a first embodiment, showing a diaphragm pair having uniform disc thickness variation and asymmetric diaphragm portions, respectively.
Figure 3B:
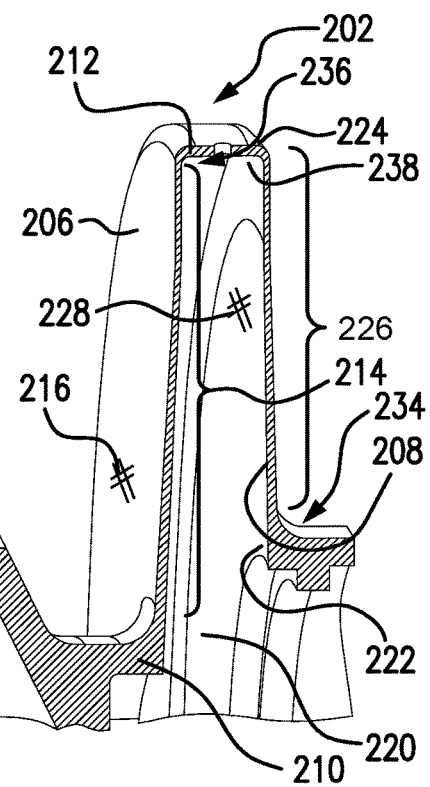
Figure 3C:
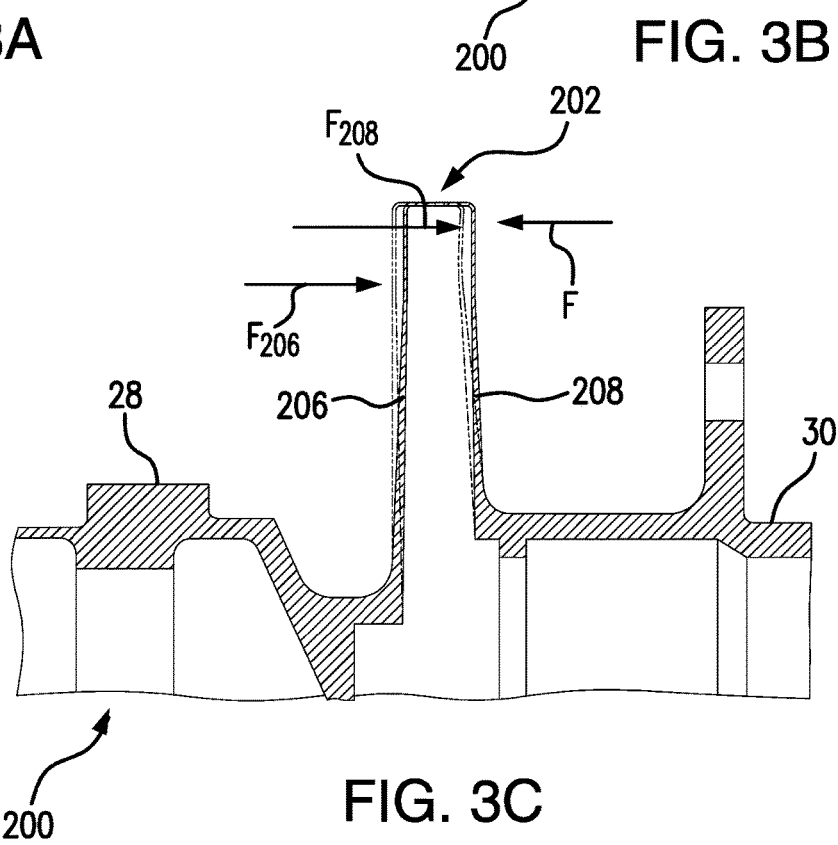

Referring to FIGS. 3A-3C, a flexible coupling 200 is shown according to an exemplary embodiment. Flexible coupling 200 is similar to flexible coupling 100 and additionally includes a first disc 206 and a second disc 208 with uniform disc thickness variation and diaphragm disc portions that are asymmetric to one another. In this respect, as shown in FIG. 3A, flexible coupling 200 has a disc pair 202 with a first disc 206 and a second disc 208. First disc 206 and second disc 208 each extend about rotation axis 104, first disc 206 connected to drive member 28 and second disc 208 connected to driven member 30.

Referring to FIG. 3B, first disc 206 has a first radially inner hub portion 210, a first radially outer rim portion 212, and a first diaphragm portion 214 extending between first radially inner hub portion 210 and first radially outer rim portion 212. Drive member 28 is connected to first radially inner hub portion 210.

Second disc 208 is similar to first disc 206 and has a second radially inner hub portion 222, a second radially outer rim portion 224, and a second diaphragm portion 226. Driven member 30 is connected to second radially inner hub portion 222. Second diaphragm portion 226 extends between second radially inner hub portion 222 and second radially outer rim portion 224. Second diaphragm portion 226 tapers radially in axial thickness at substantially the same rate as first diaphragm portion 214.

In contrast to first diaphragm portion 214, second diaphragm portion 226 begins its taper from a radial offset 234 arranged radially outward of a radial offset 234 where first diaphragm portion 214 begins its taper. More particularly, first diaphragm portion 214 and second diaphragm portion 220 taper from different radial offsets, i.e., from radial offset 234 and radial offset 236, and first diaphragm portion 214 and second diaphragm portion 220 taper to equivalent radial offsets, i.e., radial offset 236 and radial offset 238. As a consequence, a radial length of first diaphragm portion 214 is greater than a radial length of second diaphragm portion 220.

Asymmetry in the lengths of the diaphragm portions of first disc 206 and second disc 208, created by different radial lengths of first diaphragm portion 214 and second diaphragm portion 220, imparts second disc 208 with a diametral response mode 228 that is different than a diametral response mode 216 of first disc 206. The difference between diametral response mode 216 of first disc 206 and diametral response mode 228 of second disc 208 in turn provides second disc 208 with vibrational response properties differing from those of first disc 206. In certain embodiments the difference in the radial start of the diaphragm disc portions shifts the natural frequency of second disc 208 away from that of first disc 206, thereby causing second disc 208 to dampen cyclic, e.g., vibratory, forces exerted on second disc 208 by first disc 206. In accordance with certain embodiments, diametral response mode 228 of second disc 208 is selected such that second disc 208 dampens first disc 206 when first disc 206 is excited at its natural frequency, preventing resonance of first disc 206 when first disc 206 is excited at its natural frequency. It is also contemplated that diametral response mode 216 of first disc 206 can be selected such that first disc 206 dampens second disc 208 when second disc 208 is excited at natural frequency, preventing resonance of second disc 208 when excited at its natural frequency.

Referring to FIG. 3C, flexible coupling 200 is shown experiencing deformation relative to its nominal shape during rotation due to misalignment between drive member 28 and driven member 30. As shown with force F, axial misalignment 34 (shown in FIG. 2) and/or angular misalignment 32 (shown in FIG. 2) between drive member 28 and driven member 30 exerts deformation force F on flexible coupling 200. Deformation force F deforms disc pair 202, i.e. first disc 206 and second disc 208, each disc deforming differently to a point where first disc 206 and second disc 208 cooperatively force of equal and opposite magnitude to force F. In particular, first disc 206 exerts a force $F_{206}$ with a magnitude different from a force $F_{208}$ exerted by second disc 208, each force being a function of the diametral response mode of the respective disc, the difference in forces tending to dampen cyclically applied force to one discs by the other of the discs. This provides structural dampening to flexible coupling 200 that tends to increase as the magnitude of the diametral deflection increases.

Figure 4A:
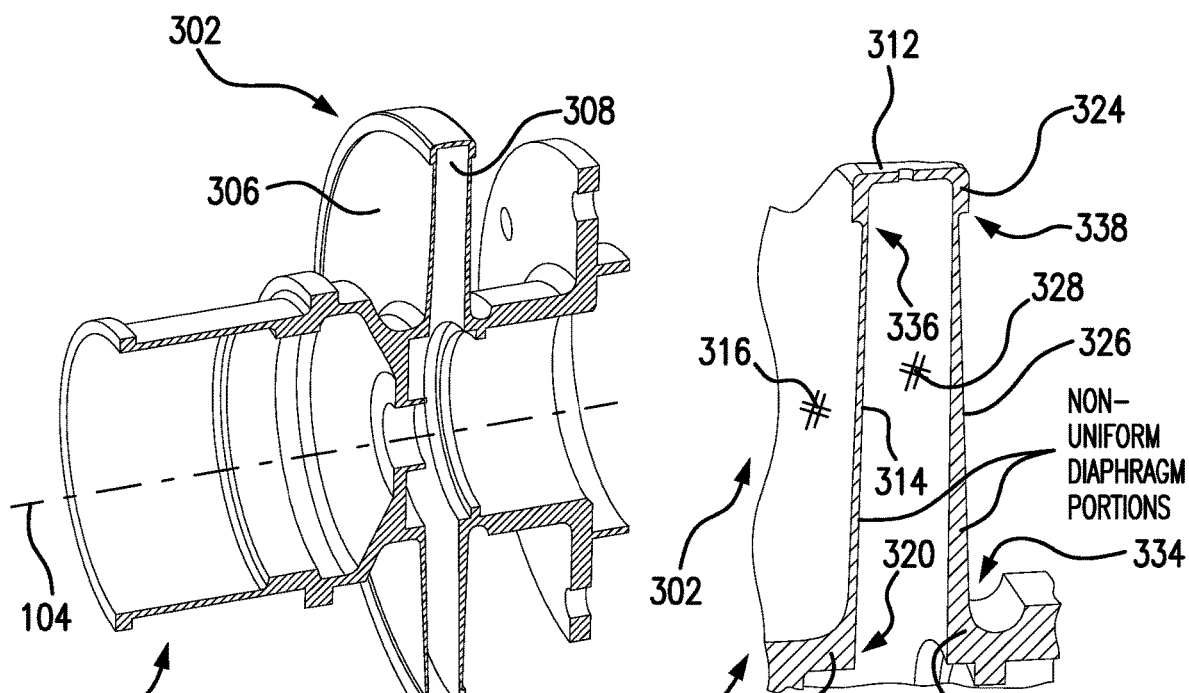
FIGS. 4A-4C are cross-sectional perspective views of the flexible coupling of FIG. 1 according to a third embodiment, showing a diaphragm pair having non-uniform disc thickness variation and symmetric diaphragm portions, respectively.
Figure 4B:
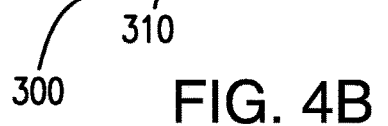
Figure 4C:
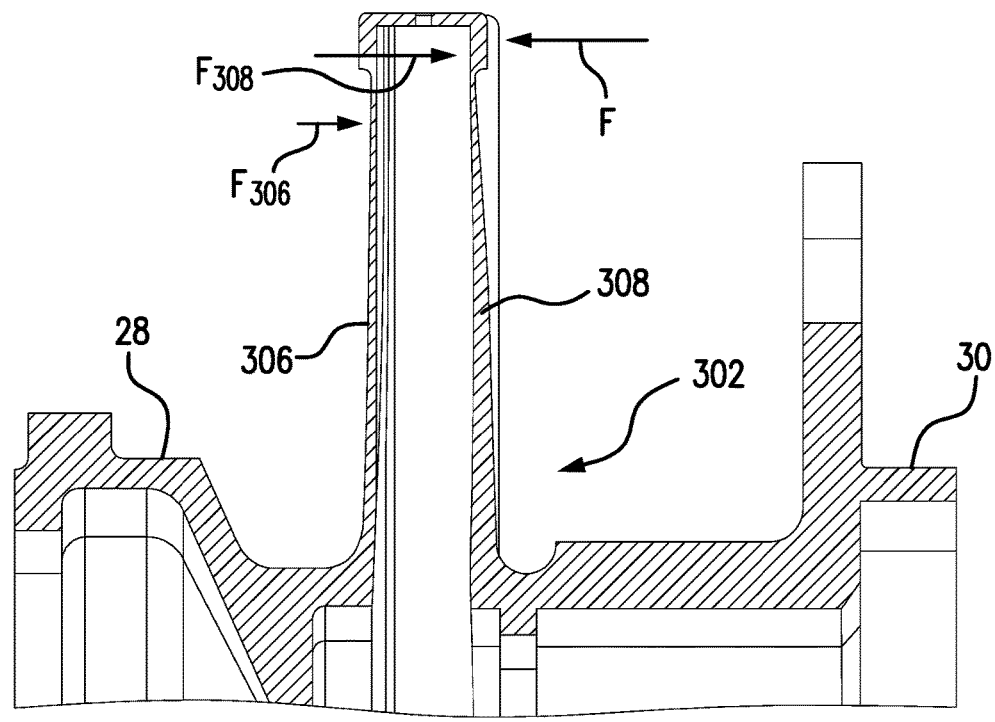

With reference to FIGS. 4A-4C, a flexible coupling 300 is shown. Flexible coupling 300 is similar to flexible coupling 100 and additionally includes a disc pair 302 having a first disc 306 and second disc 308 with non-uniform disc thickness variation and diaphragm disc portions that are symmetric to one another. As shown in FIG. 4A, disc pair 302 includes a first disc 306 and a second disc 308. First disc 306 and second disc 308 each extend about rotation axis 104. In the illustrated exemplary embodiment first disc 306 and second disc 308 have diaphragm portions that taper radially at different rates from radial offset sharing a common radial spacing from rotation axis 104.

Referring to FIG. 4B, disc pair 302 is shown. First disc 306 has a first radially inner hub portion 310, a first radially outer rim portion 312, and a first diaphragm portion 314 extending between first radially inner hub portion 310 and first radially outer rim portion 312. First diaphragm portion 314 tapers in axial thickness between an inner radial offset 320, proximate to first radially inner hub portion 310, and an outer radial offset 336, proximate to first radially outer rim portion 312.

Second disc 308 is similar to first disc 306 and has a second radially inner hub portion 322, a second radially outer rim portion 324, and a second diaphragm portion 326 extending between second radially inner hub portion 322 and second radially outer rim portion 318. Second diaphragm portion 326 tapers between an inner radial offset 334, proximate to second radially inner hub portion 322, to a radially outer offset 338, proximate to second radially outer rim portion 324. A radial length of first diaphragm portion 314 is substantially equivalent to a radial length of second diaphragm portion 326.

In the illustrated exemplary embodiment inner radial offset 334 of second disc 308 and inner radial offset 320 of first disc 306 are spaced apart from rotation axis 104 (shown in FIG. 4A) by equivalent distances. Radial outer offset 338 of second disc 308 and outer radial offset 336 of first disc 306 are spaced apart by equivalent distances from rotation axis 104. Thickness of first diaphragm portion 314 tapers between first radially inner hub portion 310 and first radially outer rim portion 312 at a rate that is different than a rate that the thickness of second diaphragm portion 326 tapers between second radially inner hub portion 322 and second radially outer rim portion 324. A maximum axial thickness (defined adjacent to a radially inner fillet) of second diaphragm portion 326 is greater that a maximum axial thickness (also defined adjacent to a radially inner fillet) of first diaphragm portion 314, and a minimum axial thickness (defined adjacent to a radially outer fillet) of second diaphragm portion 326 is greater than a minimum thickness (also defined adjacent to a radially outer fillet) of first diaphragm portion 314. The difference in the rate of taper between first diaphragm portion 314 and second diaphragm portion 326 configures first disc 306 with a diametral response mode 316 that is different than a diametral response mode 328 of second disc 308. In certain embodiments, the difference between diametral response mode 316 of first disc 306 and diametral response mode 328 of second disc 308 is selected to dampen system level excitations that can be exerted on flexible coupling 300.

Referring to FIG. 4C, flexible coupling 300 is shown experiencing force that cause deformation of disc pair 302 relative to the nominal shape of disc pair 302 during rotation due to misalignment. As indicated with force F, axial misalignment 34 (shown in FIG. 2) and/or angular misalignment 32 (shown in FIG. 2) between drive member 28 and driven member 30 exerts deformation force F on flexible coupling 300. Force F in turn deforms first disc 306 and second disc 308 collectively according to diametral response mode contributed to flexible coupling 300 individually by first disc 306 and second disc 308. In this respect first disc 306 opposes force F with a force $F_{306}$ and second disc 308 opposes force F with a force $F_{308}$, force $F_{306}$ being unequal to force $F_{308}$, force $F_{306}$ and force $F_{308}$ summing in magnitude to be equal and opposite to force F. As in the exemplary embodiments described, the different diametral response mode of first disc 306 and second disc 308 provided by unequal taper of the diaphragm portions cooperates with the non-linearity of the diametral deflection to provide structural dampening to flexible coupling 300, dampening increasing as the magnitude of the deflection increases.

Figure 5:
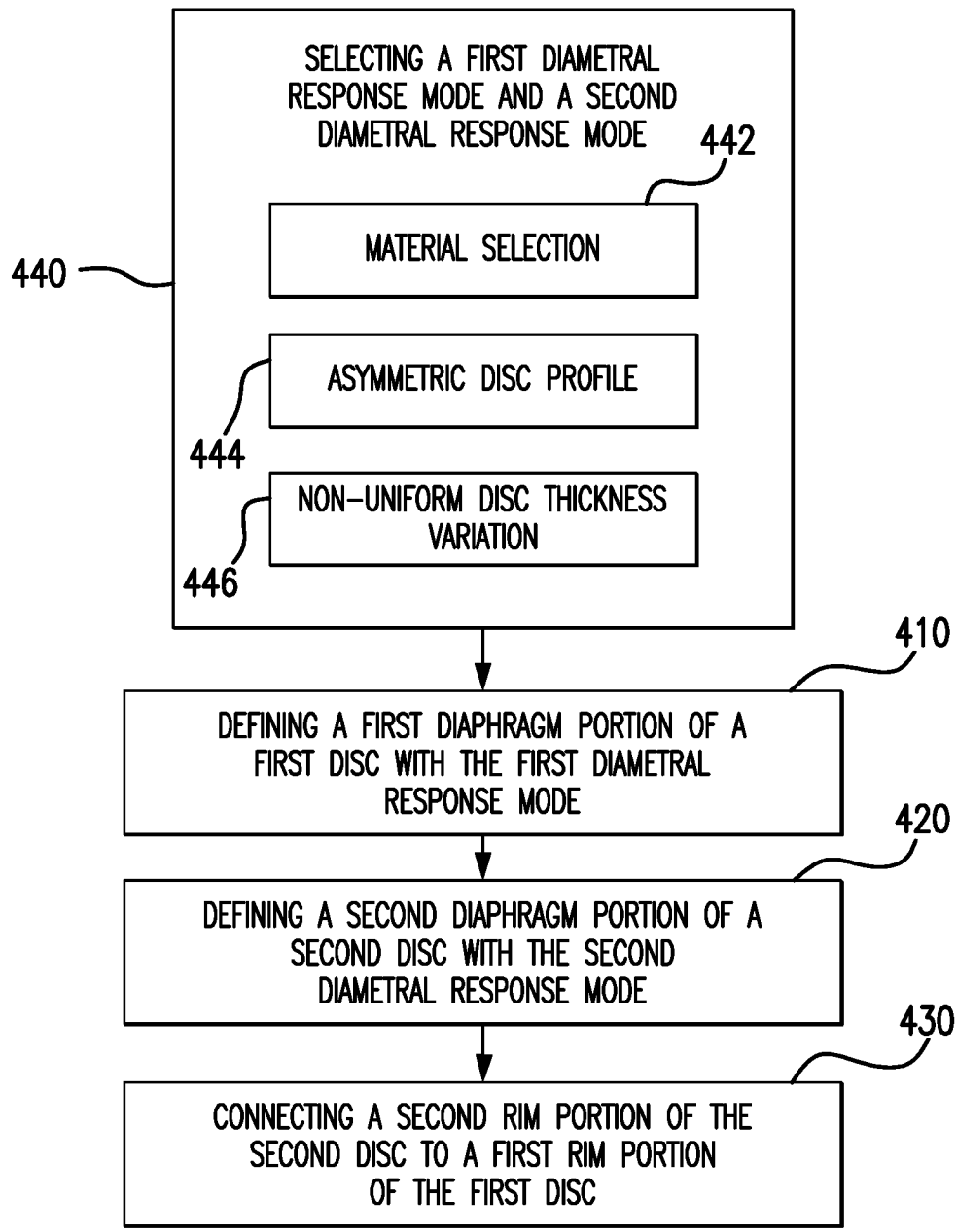
FIG. 5 is diagram of a method of making a flexible coupling, showing steps of the method according to an exemplary embodiment.

With reference to FIG. 5, a method 400 method of making a flexible coupling for a drive train, e.g., flexible coupling 100 (shown in FIG. 2) for drive train 26 (shown in FIG. 2), is shown. Method 400 includes defining a diaphragm portion between a first radially inner hub portion and a first radially outer hub portion of a first disc, e.g., first diaphragm portion 114 (shown in FIG. 2), with a first diametral response mode, e.g., diametral response mode 116 (shown in FIG. 2), as shown with box 410. Method 400 also includes defining a second diaphragm portion between a second radially inner hub portion and a second radially outer hub portion of a second disc, e.g., second diaphragm portion 126 (shown in FIG. 2), with a second diametral response mode, e.g., diametral response mode 116 (shown in FIG. 2), as shown with box 420.

The rim portion of the second disc, e.g., second radially outer rim portion 124 (shown in FIG. 2), is connected to the first radially outer rim portion of the first disc, e.g., first radially outer rim portion 112 (shown in FIG. 2), as shown with box 430. The second diametral response mode is selected to differ from the first diametral response mode by a predetermined amount to limit deformation in the flexible coupling when communicating rotation, e.g., rotation R (shown in FIG. 2), between a drive member, e.g., drive member 28 (shown in FIG. 2), and a driven member, e.g., driven member 30 (shown in FIG. 2), connected to one another by the flexible coupling, as shown by box 440. Difference between the first diametral response mode and the second diametral response mode can be selected by forming the first disc and the second disc with different materials, by forming the first and second diaphragm portion with asymmetric profiles, or by forming the diaphragm portions with non-uniform disc thickness profiles, as shown by boxes 442-446.

Drive trains generally require a certain amount of flexibility to accommodate axial misalignment and/or angular misalignment, such as that which can occur during installation or during operation. Flexible couplings with diaphragm discs are commonly employed to provide the requisite flexibility, and are generally provide excellent reliability due to their ability to undergo cyclical deformation during rotation when subjected to axial and/or angular misalignment. Such diaphragm discs are typically mounted in pairs, each diaphragm disc of the disc pair typically matching the other diaphragm disc of the pair.

The diaphragm discs generally have a natural vibratory response, i.e., a diametral response mode, that occurs at a particular frequency. Therefore, if either of the diaphragm discs of the diaphragm disc pair are excited with cyclic deflection at a frequency at (or in proximity) to the common diametral response mode of the diaphragm disc pair, the deflection amplifies, resulting in high stress and potentially resulting in fracture of the either (or both) the diaphragm discs of the diaphragm disc pair. Further, in diaphragm disc pairs with having some degree of diametral response mode detuning exists due to manufacturing variation or disc configuration for ease of manufacturing, excitation of one diaphragm disc in proximity to the diametral response mode of the other diaphragm disc can similarly amplify deformation of the other diaphragm disc, causing stress to accumulate in the other diaphragm disc. The stress accumulation can be such that the diaphragm disc cracks or fractures.

In embodiments of flexible couplings described herein disc pairs are described having detuned diametral response modes. The detuning is selected such that one diaphragm disc of the disc pair dampens the other of the diaphragm disc pair, e.g., by spacing the diametral response mode of one diaphragm disc from the diametral response mode of the other diaphragm disc. In certain embodiments the detuning diaphragm disc diametral response modes is such that the flexible coupling can tolerate system level excitation frequencies at either of the diaphragm disc diametral response modes due to damping provided by the detuned diaphragm disc having the unmatched diametral response mode, such as in flexible couplings connected to aircraft engine power takeoff shafts during speed excursions, thereby reducing the inspection burden in the field as well the need for qualification at the factory.

The methods and systems of the present disclosure, as described above and shown in the drawings, provide for flexible couplings with superior properties including diaphragm disc pairs with unmatched diametral response modes, each of the diaphragm discs having diametral response mode selected to dampen the other of the diaphragm discs when excited at frequencies at or around the other diaphragm disc diametral response mode. An analogy is a tuning fork. While matched diaphragm disc pairs can exhibit properties similar to a tuning fork, each diaphragm disc resonating and reflecting energy back from a common node when tuned to one another, diaphragm discs of diaphragm disc pairs are detuned from one another, each ceasing to amplify and sustain resonance due to the detuning relative to the other.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A multi-mode flexible coupling between a drive member and a driven member which are connected to one another by the flexible coupling, comprising:
   a first disc arranged along a rotation axis, the first disc including:
      a first radially inner hub portion;
      a first radially outer rim portion; and
      a first diaphragm portion extending between the first radially inner hub portion and the first radially outer rim portion; and
   a second disc arranged along the rotation axis, the second disc including:
      a second radially inner hub portion;
      a second radially outer rim portion; and
      a second diaphragm portion extending between the second radially inner hub portion and the second radially outer rim portion, the second radially outer rim portion connected to the first radially outer rim portion,
   wherein the first disc is shaped to have a first diametral response mode and the second disc is shaped to have a second diametral response mode that is different than the first diametral response mode to limit deformation in the flexible coupling when communicating rotation between the drive member and the driven member connected to one another by the flexible coupling, and wherein the second diaphragm portion is shaped such that the second disc dampens the first disc when the first disc is excited at a frequency corresponding to the first diametral response mode.

2. The flexible coupling as recited in claim 1, wherein the first diaphragm portion is shaped such that the first disc dampens the second disc when the second disc is excited at a frequency corresponding to the second diametral response mode.

3. The flexible coupling as recited in claim 1, wherein the first diaphragm portion and the second diaphragm portion have uniform disc thickness variation.

4. The flexible coupling as recited in claim 1, wherein the first diaphragm portion and the second diaphragm portion have non-uniform disc thickness variation.

5. The flexible coupling as recited in claim 4, wherein a radial length of the first diaphragm portion and a radial length of the second diaphragm portion are the same.

6. The flexible coupling as recited in claim 1, wherein the first diaphragm portion and the second diaphragm portion are asymmetric relative to one another.

7. The flexible coupling as recited in claim 1, wherein a radial length of the first diaphragm portion is equivalent to a radial length of the second diaphragm portion.

8. The flexible coupling as recited in claim 1, wherein a maximum thickness of the second diaphragm portion is greater than a maximum thickness of the first diaphragm portion.

9. The flexible coupling as recited in claim 1, wherein a minimum thickness of the second diaphragm portion is greater than a minimum thickness of the first diaphragm portion.

10. The flexible coupling as recited in claim 1, wherein the first diaphragm portion and the second diaphragm portion taper from different radial offsets.

11. The flexible coupling as recited in claim 1, wherein the first diaphragm portion and the second diaphragm portion taper to a common radial offset.

12. The flexible coupling as recited in claim 1, wherein a radial length of the first diaphragm portion is greater than a radial length of the second diaphragm portion.

13. The flexible coupling as recited in claim 1, wherein the thickness of the first diaphragm portion tapers between the first radially inner hub portion and the first radially outer hub portion at a rate that is different than a rate of a thickness of the second diaphragm portion tapering between the second radially inner hub portion and the second radially outer rim portion.

14. A drive train, comprising;
   a flexible coupling as recited in claim 1;
   a drive member rotatably fixed to the first disc; and
   a driven member rotatably fixed to the second disc, wherein spacing between the first diametral response mode of the first disc and an excitation frequency of the drive member is different than spacing between the second diametral response mode of the second disc and the excitation frequency of the drive member.

15. The drive train as recited in claim 14, wherein the first diaphragm portion is shaped such that the first disc dampens the second disc when the second disc is excited at a frequency corresponding to the second diametral response mode.

16. The drive train as recited in claim 14, wherein the first diaphragm portion and the second diaphragm portion have uniform disc thickness variation, wherein the first diaphragm portion and the second diaphragm portion are asymmetric relative to one another.

17. The drive train as recited in claim 14, wherein the first diaphragm portion and the second diaphragm portion have uniform disc thickness variation, and further wherein a radial length of the first diaphragm portion and a radial length of the second diaphragm portion are the same.

18. The drive train as recited in claim 14, wherein the first diaphragm portion and the second diaphragm portion have non-uniform disc thickness variation, and further wherein a radial length of the first diaphragm portion and a radial length of the second diaphragm portion are the same.

19. The drive train as recited in claim 14, wherein the first diaphragm portion and the second diaphragm portion have non-uniform disc thickness variation, wherein the first diaphragm portion and the second diaphragm portion are asymmetric relative to one another.

20. The drive train recited in claim 14, wherein the drive member is connected to an engine carried by a rotorcraft, wherein the driven member is connected to a rotorcraft rotor system.

21. A multi-mode flexible coupling between a drive member and a driven member which are connected to one another by the flexible coupling, comprising:
   a first disc arranged along a rotation axis, the first disc including
      a first radially inner hub portion,
      a first radially outer rim portion, and
      a first diaphragm portion extending between the first radially inner hub portion and the first radially outer rim portion, the first diaphragm portion including a thickness tapering in a direction toward the first radially outer rim portion; and
   a second disc arranged along the rotation axis, the second disc including
      a second radially inner hub portion,
      a second radially outer rim portion, and
      a second diaphragm portion extending between the second radially inner hub portion and the second radially outer rim portion, the second radially outer rim portion connected to the first radially outer rim portion, and the second diaphragm portion including a thickness tapering in a direction toward the second radially outer rim portion,
   wherein the thicknesses of the first and second diaphragm portions are non-uniform,
   wherein a radial length of the first diaphragm portion and a radial length of the second diaphragm portion are the same,
   wherein the first disc is shaped to have a first diametral response mode and the second disc is shaped to have a second diametral response mode that is different than the first diametral response mode to limit deformation in the flexible coupling when communicating rotation between the drive member and the driven member connected to one another by the flexible coupling.

22. A multi-mode flexible coupling between a drive member and a driven member which are connected to one another by the flexible coupling, comprising:
   a first disc arranged along a rotation axis, the first disc including
      a first radially inner hub portion,
      a first radially outer rim portion, and
      a first diaphragm portion extending between the first radially inner hub portion and the first radially outer rim portion, the first diaphragm portion tapers in axial thickness between the first radially inner hub portion and the first radially outer rim portion; and
   a second disc arranged along the rotation axis, the second disc including
      a second radially inner hub portion,
      a second radially outer rim portion, and
      a second diaphragm portion extending between the second radially inner hub portion and the second radially outer rim portion, the second radially outer rim portion connected to the first radially outer rim portion, and the second diaphragm portion tapers in axial thickness between the second radially inner hub portion and the second radially outer rim portion, wherein the axial thickness of the second diaphragm portion is greater than the axial thickness of the first diaphragm portion,
   wherein the first disc is shaped to have a first diametral response mode and the second disc is shaped to have a second diametral response mode that is different than the first diametral response mode to limit deformation in the flexible coupling when communicating rotation between the drive member and the driven member connected to one another by the flexible coupling.

\* \* \* \* \*